United States Patent
Sun et al.

(10) Patent No.: US 7,286,841 B2
(45) Date of Patent: Oct. 23, 2007

(54) METHOD AND SYSTEM FOR MAINTAINING UPLINK SYNCHRONIZATION WITH PEER-TO-PEER COMMUNICATION IN WIRELESS COMMUNICATION SYSTEM

(75) Inventors: Li Sun, Shanghai (CN); Ni Ma, Shanghai (CN); Jiang Cheng, Shanghai (CN); Qunli Jia, Shanghai (CN); Xuejun Zhang, Shanghai (CN); Yonggang Du, Shanghai (CN)

(73) Assignee: Koninklijke Philips Electronics, N.V., Eindhoven (NL)

( * ) Notice: Subject to any disclaimer, the term of this patent is extended or adjusted under 35 U.S.C. 154(b) by 34 days.

(21) Appl. No.: 10/547,586

(22) PCT Filed: Mar. 1, 2004

(86) PCT No.: PCT/IB2004/050181

§ 371 (c)(1),
(2), (4) Date: Sep. 1, 2005

(87) PCT Pub. No.: WO2004/077919

PCT Pub. Date: Sep. 16, 2004

(65) Prior Publication Data

US 2006/0166688 A1    Jul. 27, 2006

(30) Foreign Application Priority Data

Mar. 7, 2003   (CN) .............................. 03 1 19894

(51) Int. Cl.
*H04B 7/00*      (2006.01)
*H04B 15/00*     (2006.01)

(52) U.S. Cl. ............... 455/502; 455/517; 455/522; 455/509; 455/516; 455/526; 455/428; 455/455; 455/3.05; 455/90.2; 455/90.3; 370/278; 370/280; 370/311; 370/330; 370/335; 370/337; 370/342

(58) Field of Classification Search ................ 455/502, 455/517, 522, 509, 511, 514, 515, 516, 518, 455/519, 526, 415, 428, 455, 3.05, 90.2, 455/90.3, 416; 370/278, 280, 311, 330, 335, 370/337, 338, 342

See application file for complete search history.

(56) References Cited

U.S. PATENT DOCUMENTS

| | | | | |
|---|---|---|---|---|
| 6,028,853 | A  * | 2/2000  | Haartsen ..................... | 370/338 |
| 6,094,575 | A  * | 7/2000  | Anderson et al. ......... | 455/422.1 |
| 6,496,694 | B1 * | 12/2002 | Menon et al. ........... | 455/426.2 |
| 6,807,165 | B2 * | 10/2004 | Belcea ....................... | 370/347 |
| 7,079,509 | B2 * | 7/2006  | Belcea ....................... | 370/330 |

(Continued)

OTHER PUBLICATIONS

3rd Generation Partnership Project; 3GPP TS 25.402 v5.1.0, Jun. 2005, pp. 1-46, XP002261398.

*Primary Examiner*—Matthew D. Anderson
*Assistant Examiner*—Shaima Q. Aminzay (57) ABSTRACT

A method is proposed for maintaining uplink synchronization with P2P communication in wireless communication networks, comprising steps of: the wireless communication system overhears the P2P communication between two UEs (user equipments), determines the SS (synchronization shift) information of said UEs according to the overheard information transferred by each UE in P2P communication, and transmits the SS information to the corresponding UE via the downlink common control channel; the UE monitors the downlink common control channel, and adjusts the TA (timing advance) for transmitting signals according to the SS information transferred via the downlink common control channel.

21 Claims, 3 Drawing Sheets

U.S. PATENT DOCUMENTS

| | | |
|---|---|---|
| 7,082,108 B2 * | 7/2006 | Hwang et al. ............... 370/311 |
| 7,088,688 B2 * | 8/2006 | Kim et al. .................. 370/280 |
| 2006/0153105 A1 * | 7/2006 | Jia et al. .................... 370/278 |
| 2006/0229092 A1 * | 10/2006 | Jia et al. .................... 455/517 |
| 2006/0245398 A1 * | 11/2006 | Li et al. ..................... 370/335 |
| 2006/0258382 A1 * | 11/2006 | Zhang et al. ............... 455/501 |
| 2006/0258383 A1 * | 11/2006 | Jiang et al. ................ 455/502 |

* cited by examiner

METHOD AND SYSTEM FOR MAINTAINING UPLINK SYNCHRONIZATION WITH PEER-TO-PEER COMMUNICATION IN WIRELESS COMMUNICATION SYSTEM

FIELD OF THE INVENTION

The present invention relates generally to a method and system for Peer-to-Peer communication in wireless communication networks, and more particularly, to a method and system for maintaining uplink synchronization with Peer-to-Peer communication in wireless communication networks.

BACKGROUND OF THE INVENTION

Figure 1:
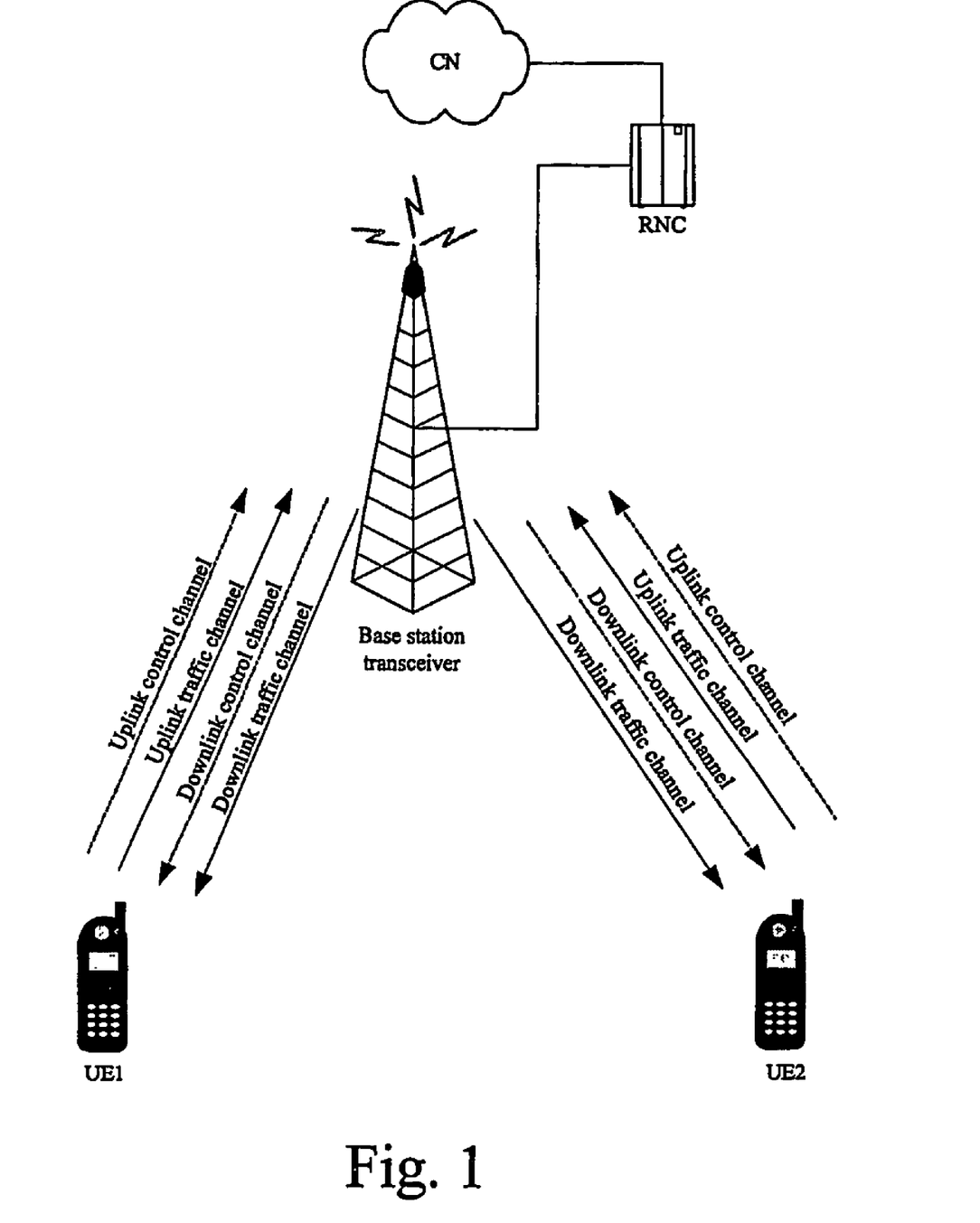
FIG. 1 is a schematic diagram illustrating conventional UP-UTRAN-DOWN communication mode.

In conventional cellular communication systems, a user equipment (UE) has to communicate with another UE only through the relaying of a base station, regardless of the distance between two communicating UEs. FIG. 1 illustrates the conventional communication mode, where UE1 and UE2 communicate with each other through the UTRAN (Universal mobile telecommunications system Terrestrial Radio Access Network) consisting of base station transceiver (namely Node B) and RNC (Radio Network Controller), and this communication mode is also called UP-UTRAN-DOWN mode. However, under some circumstances when the distance between two UEs who are camping on the same cell is very close, it can be a more reasonable way for them to communicate directly, rather than being relayed/forwarded by a base station. This method is the so-called peer-to-peer communication, abbr. as P2P.

Figure 2:
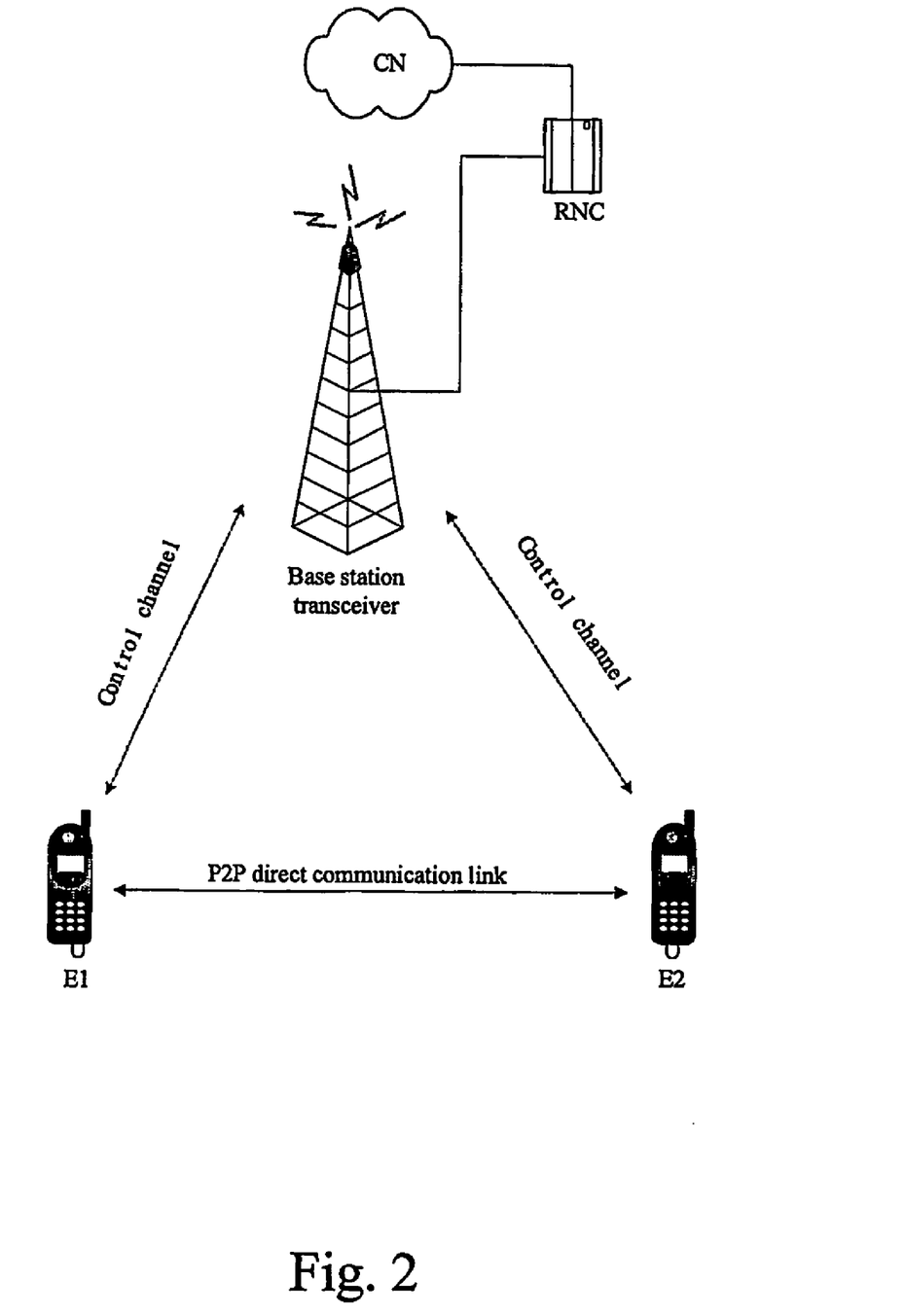
FIG. 2 is a schematic diagram illustrating P2P communication mode.

FIG. 2 shows a P2P communication mode, where the dashed line represents signaling link, the solid line represents data link, and the arrowhead represents the direction of information flow. Only signaling link exists between the UTRAN and the UEs, while only data link exists between two communicating UEs. Let's suppose only resource for maintaining basic communication is needed. If a direct link is taken as a radio resource unit (having fixed frequency, timeslot and spreading code), it can be easily inferred that P2P communication mode only needs two radio resource units to maintain basic communication. If additional signaling overheads are ignored, P2P communication can save about 50% radio resource than conventional communication mode. Meanwhile, the UTRAN still keeps control over P2P communication, especially over how to utilize radio resources, such that network operators can easily charge for the radio resource used by P2P communication.

A method and system for establishing P2P communication in wireless communication networks is described in a co-pending patent application entitled "Method and System for Establishing Peer-to-Peer Communication in Wireless Communication" filed by Koninklijke Philips Electronics N.V., on 24 Feb. 2004, Applicant's Docket No. PHCN030003WO, Application Ser. No. PCT/IB2004/050137, the disclosures of which are hereby incorporated by reference. This method and system is applicable to any TDD CDMA communication system, including TD-SCDMA system.

However, when this method and system for P2P communication is applied in a TD-SCDMA system, the direct mode of P2P communication alters the UP-UTRAN-DOWN communication mode in conventional TD-SCDMA system, i.e. a UE doesn't have dedicated traffic channel to connect with the UTRAN during P2P communication procedure. As a result, the UTRAN can only overhear information between two UEs who are communicating directly. Therefore, even if the UTRAN can overhear and estimate the synchronization shift of the two communicating UEs, it's incapable of maintaining uplink synchronization just like making that by adjusting the TA (timing advance) of uplink synchronization via a special traffic burst structure in conventional communication mode.

Accordingly, when P2P communication is applied in a TD-SCDMA system that has a rigid demand for uplink synchronization, this may potentially impair uplink synchronization and thus deteriorate the system performance.

To fully describe the negative effects upon uplink synchronization caused by the application of P2P communication in TD-SCDMA systems, a brief introduction of the uplink synchronization maintenance procedure of TD-SCDMA systems in conventional communication mode will be given below.

First, when a UE is powered on, it will first search and choose a suitable cell to camp on, and read the broadcast channel for the system information. When the UE sends a call request or responds to a paging message, it will establish uplink synchronization through random access procedure, and set the initial TA (timing advance) for the uplink traffic channel according to the synchronization adjustment information acquired from random access procedure.

Second, when the UE moves, the distance between the UTRAN and the UE will vary accordingly, which means that uplink may be out of synchronization. But due to the UE working in dedicated timeslot after being allocated dedicated resource, the UTRAN can continuously estimate the time shift information about the received signal of each subscriber by evaluating the channel impulse response of each midamble contained in the traffic burst structure used by the UEs in the uplink sub-frame, wherein the midamble for each UE is different in each uplink timeslot.

Third, if needed, the UTRAN sends an SS (Synchronization Shift) command to the UE in the traffic burst impulse in the next available downlink timeslot. On receipt of the SS command, the UE adjusts the timing of its transmission in step of ±k/8 chips each M sub-frames, or just Ignores the SS command. The default value of M (from 1 to 8) and k (from 1 to 8) is broadcast in the BCH (Broadcast Channel). The value of M and k can also be adjusted during call setup procedure, or readjusted during call procedure.

From the above steps, it can be seen that a UE can acquire uplink TA to ensure uplink synchronization from the SS message sent by the UTRAN in the downlink via the traffic channel in TD-SCDMA systems.

When the UE works in CONNECT mode and uplink synchronization is lost, the above step 2 to 3 will be iterated continuously to maintain uplink synchronization until the call ends.

During the handover procedure from a TD-SCDMA cell to another TD-SCDMA cell, the UE will transmit signals in the new cell with the TA adjusted by the relative timing difference Δt between the new cell and the old one. The relative timing difference Δt can be acquired from the system information broadcast in the BCH, or is contained in handover command.

The above uplink synchronization maintenance procedure for conventional communication mode is a closed-loop uplink synchronization control procedure based upon the DPCH (dedicated physical channel) and the PUSCH (physical uplink shared channel).

SUMMARY OF THE INVENTION

It is, therefore, an object of the present invention to provide a method and system to maintain uplink synchronization with P2P communication in wireless communication networks. In the proposed method and system, the paging control channel is reused to address the problem that uplink synchronization can't be maintained by adjusting the TA for the uplink synchronization in traffic burst structure without dedicated traffic channel between the UEs and the UTRAN.

To achieve the object of the present invention, a method for P2P communication to maintain uplink synchronization in wireless communication systems is proposed, comprising:

overhearing the P2P communication between two UEs;

computing the characteristic parameter of each UE according to the overheard information transferred by each UE during P2P communication;

determining the SS (synchronization shift) information of each UE according to the computed characteristic parameter of each UE;

transmitting the determined SS information to the corresponding UE via the downlink common control channel, such as the paging control channel, so that the UE can maintain uplink synchronization.

To achieve the above object of the present invention, a method for a UE to maintain uplink synchronization with P2P communication is proposed, comprising:

monitoring the downlink common control channel;

receiving the SS information transferred via the downlink common control channel;

adjusting the TA for the UE to transmit signals according to the received SS information.

To achieve the above object of the present invention, an system for a wireless communication system to maintain uplink synchronization with P2P communication is proposed, comprising:

an overhearing unit, for overhearing the P2P communication between two UEs;

a computing unit, for computing the characteristic parameter of each UE according to the overheard information transferred by each UE during P2P communication;

an SS information generating unit, for determining the SS information of the UE according to the computed characteristic parameters of each UE;

a transmitting unit, for transmitting the determined SS information to the corresponding UE via the downlink common control channel so that the UE can maintain uplink synchronization.

To achieve the above object of the present invention, a UE is proposed, comprising:

a transceiver, for receiving or transmitting radio signals;

a monitoring unit, for monitoring the downlink common control channel;

a receiving unit, for receiving the SS information transferred via the downlink common control channel;

an adjusting unit, for adjusting the TA for the UE to transmit signals according to the received SS information.

DETAILED DESCRIPTION OF THE INVENTION

In a P2P-enabled TD-SCDMA system, when a UE enters direct communication mode, the mobility of the UE will lead to variation in the distance between the UE and the UTRAN. Thus, even if synchronization has been established during access procedure, uplink synchronization will be lost. Therefore, uplink synchronization procedure is still required during P2P communication.

In a P2P-enabled TD-SCDMA system, SS commands can be transferred via the paging control channel in the downlink, for the UEs to maintain downlink synchronization.

The paging control channel includes PICH (Paging Indication Channel) and PCH (Paging Channel), which are shared by a plurality of UEs in the same paging area. By calculating the number of IMSI (International Mobile Station Identification), the DRX (Discontinuous Reception) cycle and the number of common control channels, the serial number of the paging block to which the UEs in the same paging area respectively belong, can be obtained, i.e., the serial number of the paging block is potentially the position of the paging message containing SS commands in the paging channel, wherein the DRX cycle can be calculated from the parameter broadcast in the system information and the calculation method is the same as that in IDLE mode.

It's well known that the UE monitors the related paging control channels according to the specified DRX cycle only in IDLE mode, or in CELL-PCH state or URA-PCH state of CONNECT mode. After being allocated dedicated physical channel and entering CELL-DCH state of CONNECT mode, the UE will no longer monitor the related PICH and PCH.

However, PICH and PCH are common control channels, usually located in Primary CCPCH (Common Control Physical Channel) and Secondary CCPCH, and their positions can be obtained from the system information. Furthermore, by calculation, the UE and the UTRAN both can acquire the position of the paging channel to which the UE belongs. Therefore the UE will keep on checking and reading information in the two channels if this is required and mandatory during communication procedure. Thus, in a P2P-enabled TD-SCDMA system, the PICH and PCH can be used for the UTRAN to transmit SS commands when needed.

In the following, detailed description will be given to the procedure for maintaining uplink synchronization by reusing the paging control channel to transmit SS commands. The steps can be summarized as follows:

1. Establish Uplink Synchronization Through Random Access Procedure

Figure 3:
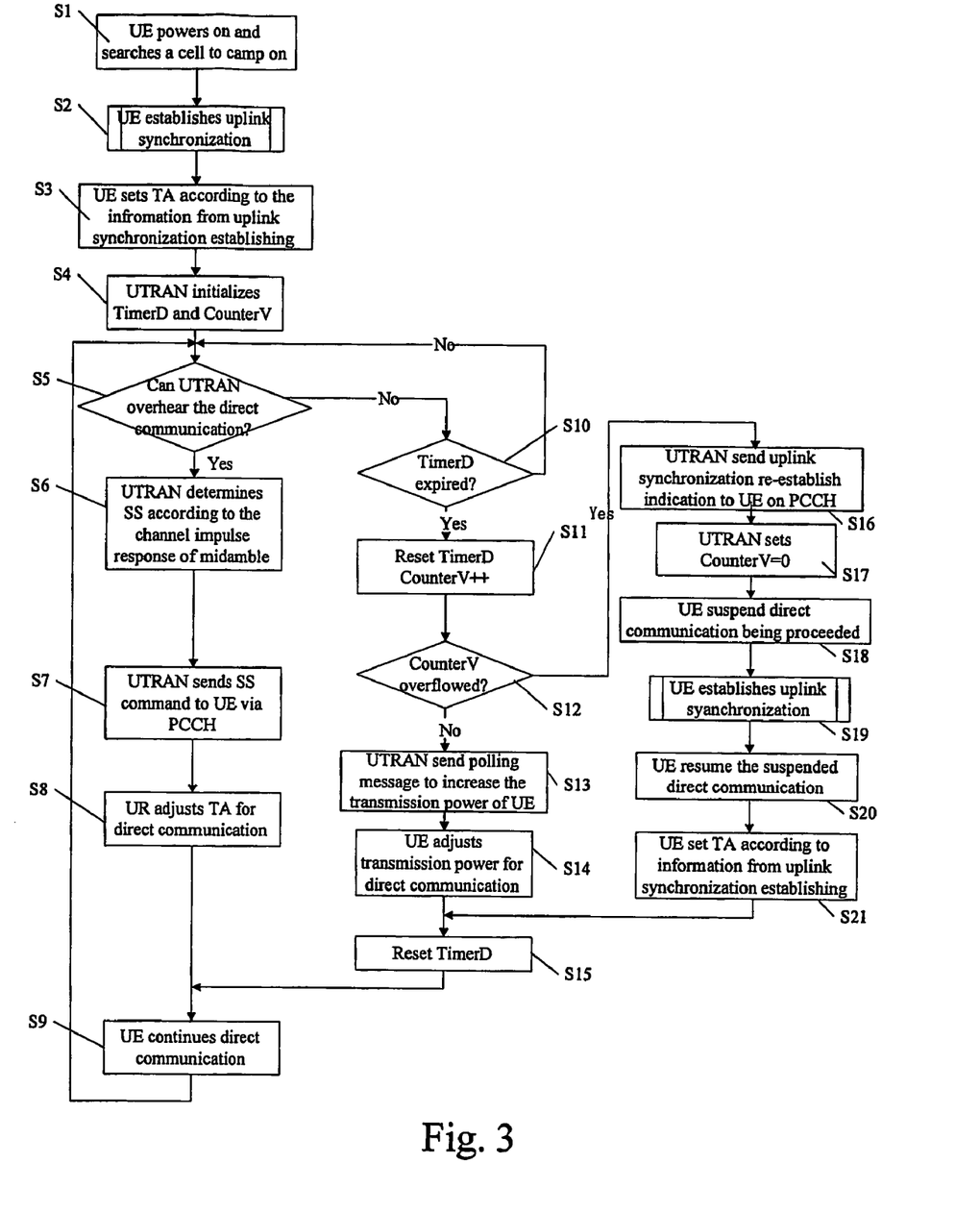
FIG. 3 is a flowchart illustrating the method for maintaining uplink synchronization with P2P communication in a TD-SCDMA system.

The same as conventional communication mode, during this procedure, the UE is powered on and searches for a cell to camp on (S1), establishes uplink synchronization between the UE and the UTRAN (S2), and sets the TA according to the result of uplink synchronization establishment (S3).

2. Maintain Uplink Synchronization by Using the Paging Control Channel

First, determine whether the UTRAN can overhear the direct communication between the UEs who are communicating in P2P direct mode (S5).

When the UTRAN can overhear the direct communication between the UEs, it will estimate the time shift of the received subscriber signal continuously or regularly (depending on the DRX cycle), to determine the SS command for the UE, by calculating the CIR (channel impulse response) of the midamble of each UE in the timeslot allocated for the direct communication link (S6).

In the PICH and PCH to which the UE in the next available paging area belongs, the UTRAN sends SS commands to the UEs in the paging area (S7).

During direct communication, the UE should monitor and regularly read the paging control channel to which it belongs, besides the dedicated direct link channel. After receiving the SS command from the UTRAN via the paging control channel, the UE adjusts its TA for direct communication in step of ±k/8 chips or just ignores the SS command, wherein the default value of k (from 1 to 8) is broadcast in the BCH and the value of k can also be adjusted during call setup, or readjusted during call procedure (S8).

Afterwards, the UE continues to communicate directly (S9), and the UTRAN continues to monitor direct communication between the UEs.

3. Send Poll Messages and Adjust the Transmission Power for the UE

When the UTRAN can't overhear the direct communication between the UEs, a timer and a counter will be set (S4).

The timer is for setting a time limit, the acceptable maximum period for not being able to overhear the direct communication. This ensures that the time shift of the direct communication maintains in the assigned timeslot and will not float to another timeslot. When the timer expires, the UTRAN will send a P2P poll message to the UE via the paging control channel, to enable the UE to adjust its power for transmitting signals according to the poll message, so that the UTRAN can overhear signals transmitted by the UE.

The counter sets the number for the UTRAN to send P2P poll messages so that the UE can adjust its power to transmit signals according to the poll message every time the UTRAN transmits.

The specific steps includes:

When the UTRAN can't overhear direct communication between the UEs, it will check whether the timer expires (S10). When the timer is yet to expire, the above step S5 will be continued to determine whether the UTRAN can overhear direct communication between the UEs, and at this time the UTRAN ignores the situation that direct communication can't be overheard, with assumption that direct communication for the UEs is still maintained in assigned timeslot but only can't be overheard just because of a too low transmission power or interference from other UEs. If the timer expires, the timer is reset and the counter is increased by 1 (S11), and a check will be performed about whether the counter exceeds the maximum value (S12). If the counter doesn't overflow, the UTRAN will send a P2P poll message to the relevant UE in the next available paging control channel, to require the relevant UE to transmit signals with the set power (step S13). The UE monitors and reads the paging control channel regularly. On receipt of the P2P poll message transferred via said paging control channel, the UE adjusts its transmission power according to the indication in the poll message or the negotiated power, to ensure that the UTRAN can overhear its signals (S14). Afterwards, the UE resets the timer (step S15). On the premise that the counter doesn't overflow, the UTRAN continuously sends poll messages so that the UE can continuously adjusts its transmission power until it can overhear the relevant direct communication. If the UTRAN fails to overhear the direct communication until the counter overflows, it can be determined that the direct communication has been out of synchronization, and the UTRAN will start the uplink synchronization reestablishment procedure.

4. Uplink Synchronization Reestablishment Procedure

When the counter overflows in the above step S12, the UTRAN sends an uplink synchronization reestablishment indication to each UE via said paging control channel (step S16). The UTRAN resets the counter to 0 (step S17). On receipt of the uplink synchronization reestablishment indication transferred via the paging control channel, the UE suspends the current direct communication (step S18), and reestablishes uplink synchronization in way of random access procedure according to the uplink synchronization reestablishment indication (step S19). After reestablishing uplink synchronization with the UTRAN, the UE resumes the suspended direct communication (step S20) and sets the TA according to the result of uplink synchronization reestablishment (step S21).

In the foregoing step S16, the UTRAN may send an uplink synchronization reestablishment indication to the UE according to the overflow of the counter, or send an uplink synchronization reestablishment indication to the UE when the adjusted transmission power of the UE reaches a predefined value.

During the P2P direct communication, the above procedure for maintaining uplink synchronization is reiterated until the direct communication ends, and then the UTRAN reclaims the allocated radio resource.

The foregoing method for maintaining uplink synchronization with P2P communication in conjunction with FIG. 3, can be implemented both in software and hardware, or in combination of software and hardware. When the above method for maintaining uplink synchronization is implemented in hardware, the system for maintaining uplink synchronization in the UTRAN and that for the UE, are respectively as follows:

In P2P communication, the system for the UTRAN to maintain uplink synchronization in TDD CDMA systems, comprises: an overhearing unit, for overhearing the P2P communication between two UEs; a computing unit, for computing the characteristic parameter of each UE according to the overheard information transferred by each UE during P2P communication, wherein the characteristic parameter is the midamble information in the traffic burst structure; an SS information generating unit, for determining the SS information of the UE according to the computed characteristic parameters of each UE; a transmitting unit, for transmitting the determined SS information to the corresponding UE via the downlink common control channel so that the UE can maintain uplink synchronization; a timer, for setting the time limit in which the wireless communication system can't overhear said P2P communication; a poll message sending unit, for sending P2P poll message to the UE via said downlink common control channel so that the UE can adjust its transmission power according to the poll message, when the time during which the wireless communication system can't overhear said P2P communication exceeds the time limit of the timer; a counter, for counting the number of sending P2P poll messages to the UE by the UTRAN; a synchronization reestablishing indication sending unit, for sending uplink synchronization reestablishment indications via said downlink common control channel to each UE, when the recorded number in the counter exceeds a predefined value or the transmission power adjusted by the UE reaches a predefined value.

In P2P communication, the system for the UE to maintain uplink synchronization with P2P communication in TDD CDMA systems, comprises: a monitoring unit, for monitoring the paging control channel; a receiving unit, for receiving the SS information transferred via the downlink common control channel; an adjusting unit, for adjusting the TA for the UE to transmit signals according to the received SS information; a poll message receiving unit, for receiving P2P poll messages transferred via said downlink common control channel; a power adjusting unit, for adjusting the transmission power according to the received poll message or a predefined value, and the power adjusting unit can adjust the transmission power many times according to the poll messages received many times; a synchronization reestablishment indication receiving unit, for receiving an uplink synchronization reestablishment indication transferred via said downlink common control channel; an uplink synchronization reestablishing unit, for reestablishing uplink synchronization according to the uplink synchronization reestablishment indication.

As described above, the uplink synchronization maintenance procedure proposed in the present invention, adds uplink SS command, state poll message of direct communication and uplink synchronization reestablishment command into the original paging message, to solve the problem that uplink synchronization can't be maintained by adjusting the TA for the uplink synchronization in traffic burst structure without dedicated traffic channel between the UE and the UTRAN. Thus, the interference of P2P direct communication to the system can be eliminated, and the orthogonal integrity of the modulated spreading code for uplink signal can be kept.

Although a method is proposed in this invention to transfer SS commands via the paging control channel, it's to be understood by those skilled in the art that other channels in the downlink common control channel can also be adopted to transfer SS commands to adjust uplink synchronization for the UE.

Furthermore, it's to be understood by those skilled in the art that the method for maintaining uplink synchronization with P2P communication proposed in this invention is also applicable to other TD-SCDMA wireless communication systems and advanced wireless communication systems in 3GPP that have certain requirements for uplink synchronization.

It is also to be understood by those skilled in the art that the method for maintaining uplink synchronization with P2P communication disclosed in this invention can be modified considerably without departing from the spirit and scope of the invention as defined by the appended claims.

What is claimed is:

1. A method for wireless communication systems to maintain uplink synchronization in P2P (peer-to-peer) communication, performed by a UTRAN (Universal mobile telecommunications system Terrestrial Radio Access Network) base station transceiver of a wireless communication system, comprising:
   overhearing a direct communication link of the P2P communication between two UEs (user equipments) with the UTRAN base station transceiver;
   computing a characteristic parameter of each UE at the UTRAN base station transceiver according to the overheard information transferred by each UE during P2P communication, wherein said computed characteristic parameter of each UE is based upon midamble information in a traffic burst structure of the overheard information of the direct communication link;
   determining SS (synchronization shift) information of each UE at the UTRAN base station transceiver according to the computed characteristic parameter of each UE; and
   transmitting the determined SS information from the UTRAN base station transceiver to a corresponding UE via a downlink common control channel wherein responsive to the SS information said corresponding UE operates to maintain uplink synchronization with the UTRAN base station transceiver during the P2P communication between the two UEs.

2. The method for maintaining uplink synchronization in P2P communication according to claim 1, wherein said computed characteristic parameter of each UE further comprises a calculated CIR (channel impulse response) of the midamble information in the traffic burst structure of each UE in a timeslot allotted for the direct communication link of the P2P communication.

3. The method for maintaining uplink synchronization in P2P communication according to claim 1, further comprising:
   setting a time limit for sending a P2P poll message to the UE via said downlink common control channel when the time during which the wireless communication system can't overhear said P2P communication exceeds the time limit, so that the UE can adjust its transmission power according to the poll message.

4. The method for maintaining uplink synchronization in P2P communication according to claim 3, further comprising:
   resending a poll message to the UE so that the UE can adjust its transmission power according to the poll message, when the wireless communication system can't yet overhear said P2P communication within said time limit after the UE adjusts its transmission power.

5. The method for maintaining uplink synchronization in P2P communication according to claim 4, further comprising:
   setting the number of sending P2P poll messages to the UE by the wireless communication system; and
   sending an uplink synchronization reestablishment indication to each UE via said downlink common control channel, when the number of sending communication poll messages to the UE by the wireless communication system exceeds the set maximum value.

6. The method for maintaining uplink synchronization in P2P communication according to claim 4, wherein an uplink synchronization reestablishment indication is sent to each UE via said downlink common control channel when the transmission power adjusted by the UE reaches a set value.

7. The method for maintaining uplink synchronization in P2P communication according to claim 1, wherein said downlink common control channel comprises a paging control channel.

8. A method for a UE (user equipment) to maintain uplink synchronization with a UTRAN (Universal mobile telecommunications system Terrestrial Radio Access Network) base station transceiver during a direct communication link in P2P (peer-to-peer) communication with a second UE (user equipment), performed by the UE, comprising:
   monitoring a downlink common control channel;
   receiving SS (synchronous shift) information transferred via the downlink common control channel, the SS information having been determined at the UTRAN (Universal mobile telecommunications system Terrestrial Radio Access Network) base station transceiver according to a computed characteristic parameter of the UE during the P2P communication, wherein the computed characteristic parameter is based upon midamble information in a traffic burst structure in the direct communication link as overheard by the UTRAN base station transceiver; and adjusting the TA (timing advance) for the UE to transmit signals according to the received SS information to maintain the uplink synchronization with the UTRAN base station transceiver during the P2P communication with the second UE.

9. The method for maintaining uplink synchronization in P2P communication according to claim 8, further comprising:

receiving a P2P poll message transferred via said downlink common control channel; and adjusting the transmission power according to the received poll message.

10. The method for maintaining uplink synchronization in P2P communication according to claim 8, further comprising:

receiving an uplink synchronization reestablishment indication transferred via said downlink common control channel; and reestablishing uplink synchronization according to the uplink synchronization reestablishment indication.

11. The method for maintaining uplink synchronization in P2P communication according to claim 8, wherein said downlink common control channel is a paging control channel.

12. A system including a UTRAN (Universal mobile telecommunications system Terrestrial Radio Access Network) base station transceiver configured for wireless communication systems to maintain uplink synchronization in P2P (peer-to-peer) communication, comprising:

an overhearing unit, for overhearing a direct communication link of the P2P communication between two UEs (user equipments);

a computing unit, for computing a characteristic parameter of each UE according to overheard information transferred by each UE in the P2P communication wherein said computed characteristic parameter of each UE is based upon midamble information in a traffic burst structure of the overheard information of the direct communication link;

an SS (synchronization shift) information generating unit, for determining SS information of each UE according to the computed characteristic parameter of the corresponding UE; and a transmitting unit, for transmitting the determined SS information to the corresponding UE via the downlink common control channel, wherein responsive to the determined SS information the corresponding UE operates to maintain uplink synchronization with the UTRAN base station transceiver during the P2P communication between the two UEs.

13. The system for maintaining uplink synchronization in P2P communication according to claim 12, wherein said characteristic parameter of each UE further comprises a calculated CIR (channel impulse response) of the midamble information in the traffic burst structure of each UE in a timeslot allotted for the direct communication link of the P2P communication.

14. The system for maintaining uplink synchronization in P2P communication according to claim 12, further comprising:

a timer, for setting a time limit in which the wireless communication system can't overhear said P2P communication; and a poll message sending unit, for sending a P2P poll message to a corresponding UE via said downlink common control channel so that the corresponding UE can adjust its transmission power according to the poll message when the time during which the wireless communication system can't overhear said P2P communication exceeds the time limit of the timer.

15. The system for maintaining uplink synchronization in P2P communication according to claim 14, further comprising:

a counter, for counting the number of sending P2P poll messages to the corresponding UE by the wireless communication system.

16. The system for maintaining uplink synchronization in P2P communication according to claim 15, further comprising:

a synchronization reestablishing indication sending unit, for sending uplink synchronization reestablishment indications via said downlink common control channel to each UE, when the counted number in the counter exceeds a predefined value or the transmission power adjusted by the corresponding UE reaches a set value.

17. The system for maintaining uplink synchronization in P2P communication according to claim 12, wherein said downlink common control channel is a paging control channel.

18. A UE (user equipment) having capability for maintaining uplink synchronization with a UTRAN (Universal mobile telecommunications system Terrestrial Radio Access Network) base station transceiver of a wireless communication system during a direct communication link in P2P (peer-to-peer) communication with another UE, comprising:

a transceiver, for receiving or transmitting radio signals;

a monitoring unit, for monitoring a downlink common control channel transmitted from the UTRAN (Universal mobile telecommunications system Terrestrial Radio Access Network) base station transceiver of the wireless communication system;

a receiving unit, for receiving SS (synchronization shift) information transferred via the downlink common control channel, the SS information having been determined by the UTRAN (Universal mobile telecommunications system Terrestrial Radio Access Network) base station transceiver of the wireless communication system according to a characteristic parameter of the UE during the P2P communication, wherein the computed characteristic parameter is based upon midamble information in a traffic burst structure in the direct communication link as overheard by the UTRAN base station transceiver; and an adjusting unit, for adjusting a TA (timing advance) for the UE to transmit signals according to the received SS information to maintain the uplink synchronization with the UTRAN base station transceiver of the wireless communication system during the P2P communication with the other UE.

19. The UE according to claim 18, further comprising:

a poll message receiving unit, for receiving a P2P poll message transferred via said downlink common control channel; and a power adjusting unit, for adjusting the transmission power according to the received P2P poll message.

20. The UE according to claim 18, further comprising:

a synchronization reestablishing indication receiving unit, for receiving an uplink synchronization reestablishment indication transferred via said downlink common control channel; and an uplink synchronization reestablishing unit, for reestablishing uplink synchronization according to the uplink synchronization reestablishment indication.

21. The UE according to claim 18, wherein said downlink common control channel is a paging control channel.

* * * * *